Jan. 19, 1937.  J. A. GIVEN  2,068,017
TRACK LEVEL INDICATOR
Filed Feb. 25, 1936  2 Sheets-Sheet 1
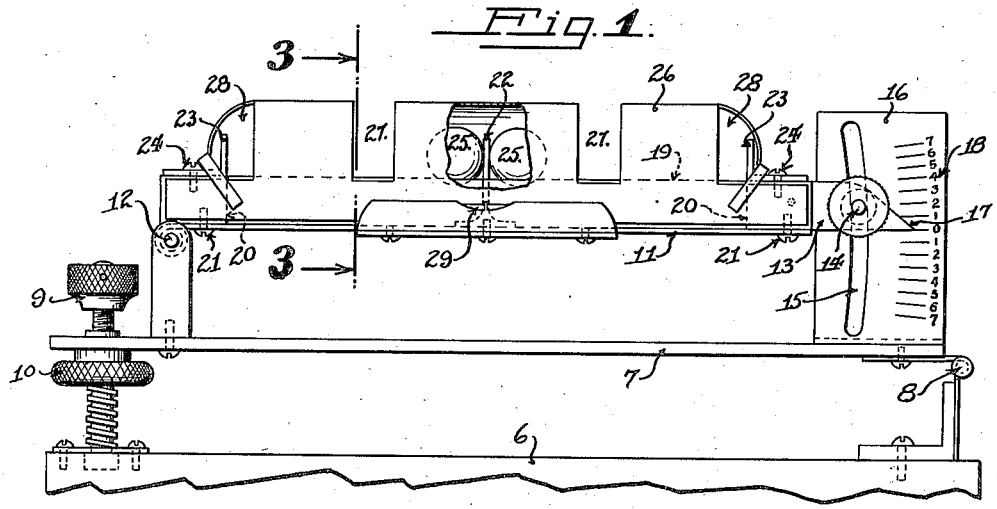
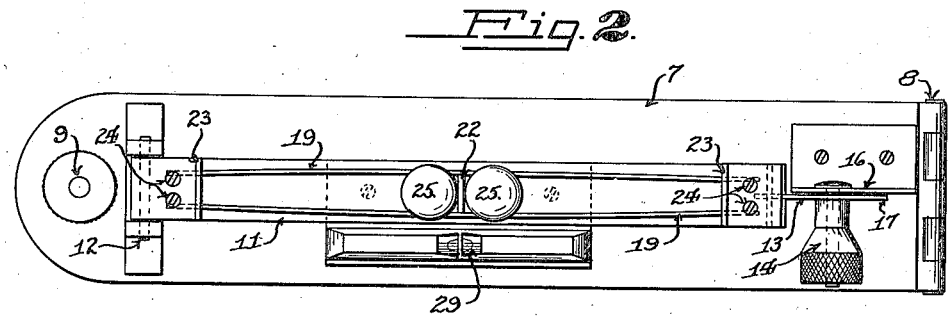
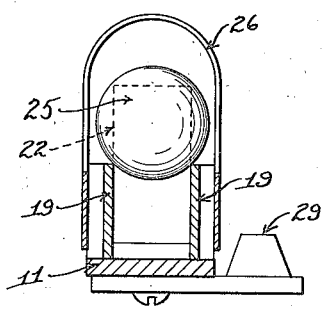
INVENTOR,
Jay A. Given
BY Booth & Booth
ATTORNEYS.

Jan. 19, 1937.    J. A. GIVEN    2,068,017
TRACK LEVEL INDICATOR
Filed Feb. 25, 1936    2 Sheets-Sheet 2

INVENTOR.
BY Jay A. Given
Booth & Booth
ATTORNEYS.

Patented Jan. 19, 1937

2,068,017

UNITED STATES PATENT OFFICE 2,068,017

TRACK LEVEL INDICATOR

Jay A. Given, Dunsmuir, Calif.

Application February 25, 1936, Serial No. 65,557

8 Claims. (Cl. 33—206)

The present invention relates to instruments for indicating the transverse level, or difference in elevation between the two rails, of a railway track.

Track which is out of level on tangents or has irregular superelevation on curves does not ride properly and, if these irregularities are of sufficient amount, such track conditions may contribute to derailments. If such conditions can be discovered and corrected while still in their incipient stages, the track is maintained in good riding condition and the work required of section gangs is reduced to a minimum. On the other hand, small irregularities gradually increase until they ultimately cause the track to go out of line or result in spread gauge. When this occurs, the defect is visible to the eye and generally this is the first warning that the section foreman receives. It is then necessary not only to surface the track but also to correct the line and gauge, all of which involves several times the labor which would have been necessary if the condition had been fixed while still in its early stages.

The principal object of the present invention is to provide an instrument adapted to be carried on a car traveling over the track, such as a track inspector's motor or any other suitable car, which will indicate at a glance any deviation from level on tangents, or any irregular superelevation on curves. Another object is to provide an instrument which is easy to read, and which is sufficiently rugged to withstand the jarring and rough usage incident to its use. Still further objects and advantages will be brought out in the following specification, which should be read with the understanding that the form, construction and arrangement of the several parts may be varied, within the limits of the appended claims, without departing from the spirit of the invention.

Reference will be made to the accompanying drawings, in which

Fig. 1 is a side elevation, partly broken, of a preferred embodiment of the invention.

Fig. 2 is a plan view of the same with the protective housing removed.

Fig. 3 is a section on the line 3—3 of Fig. 1.

Figure 4:
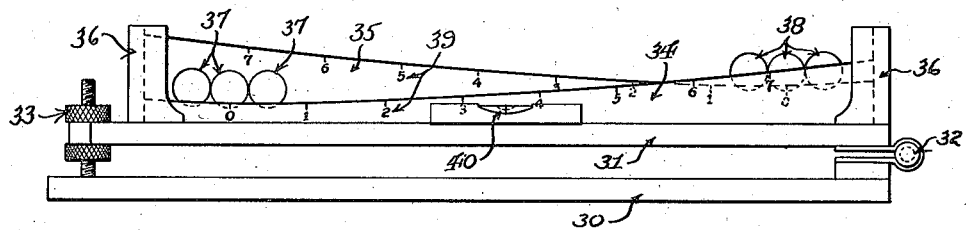
Fig. 4 is a side elevation of a modified form of the invention.

In the drawings and referring for the moment to Figs. 1, 2, and 3 thereof, the reference numeral 6 designates a base which is understood to be mounted upon a suitable car. Positioned above the base is a frame member in the form of a horizontal plate 7. The plate 7 is connected with the base at one end by a hinge 8, and at the other end by an adjusting screw 9 provided with a lock nut 10.

Above the plate 7 is another horizontal plate 11 forming the body of the instrument, connected at one end with the plate 7 by a hinge 12. The other end of the body 11 carries an extension 13 provided with a clamping bolt 14 positioned to slide in an arcuate slot 15, said slot being formed in a vertical bracket 16 rising from the plate 7. The end of the extension 13 forms a pointer 17 which travels over a scale 18 marked upon the bracket 16.

A pair of strips of spring steel 19 are mounted on edge upon the body 11. The ends of said strips 19 are held in permanent spaced relation in slots formed in blocks 20, said blocks being secured to the body 11 by screws 21. The spring strips 19 are separated by a transverse spacer 22 which is secured to and rises from the body 11 midway between the ends of said spring strips 19, said spacer rising above the upper edges of the strips. At the ends of the strips, L-shaped stop plates 23 are secured to the blocks 20 by screws 24.

The spring strips 19 form a track or raceway upon which are mounted a pair of freely rolling balls 25, there being one ball at each side of the center spacer 22, and each ball being free to roll between said spacer and one of the end stop plates 23. The two end portions of the strips thus form, in effect, two separate aligned raceways, there being one ball upon each. The spring strips 19 are separated by a greater distance at their centers than at their ends, as shown in Fig. 2, which causes the balls 25 to be elevated slightly as they roll towards the ends of said strips. This provides the raceway with an effective curvature in a vertical plane, its ends having the effect of rising above the horizontal plane of its center, although the only actual curvature is the horizontal bending of the strips 19. The balls 25, therefore, roll toward the center when the instrument is in a level positon and rest against the center spacer 22. As one end of the instrument is elevated the ball on the other side of the spacer 22 rolls outwardly toward the lower end of the raceway, and because the effective curvature of the raceway is produced by the springing or bending of the spring strips 19, said effective curvature has substantially the form of an arc of a circle. The travel of the ball from the center to the outer end is therefore proportional to the elevation of the opposite end of the instrument, and the position of the ball along the raceway will indicate the extent of elevation or deviation from the level positon.

The raceway is partially covered and enclosed by a housing 26 which prevents the balls from jumping out of the raceway when the instrument is violently jarred. The housing 26 is provided with slots or apertures 27 approximately half way between the center of the instrument and its ends, and with similar apertures 28 at the ends. The balls 25 are therefore invisible except when they travel far enough to appear in one of the apertures 27 or 28. These apertures are so positioned with relation to the effective curvature of the raceway that the appearance of a ball in one of them indicates a predetermined extent of deviation of the track from the level. It is preferred to make the appearance of the ball in the aperture 27 indicate a deviation of one quarter of an inch on the part of one rail from the horizontal plane of the other rail, and the appearance of the ball in the end aperture 28 indicates a deviation of one half an inch.

The instrument is mounted transversely upon a car, preferably in a position in front of the operator, where it is within or close to his normal line of vision as he looks ahead along the track. The entire outside of the instrument and the inside of the housing 26 are preferably painted black. The balls are polished steel. Therefore, when one of them appears in one of the apertures the contrast between its polished surface and the black of the surrounding parts immediately attracts the attention of the operator. He thereupon drops a suitable marker upon the track to indicate that it is out of level at that point.

The clamping bolt 14 is used in conjunction with the pointer 17 and scale 18 to set the instrument to a predetermined degree of superelevation when traveling over curved track. For example, when the inspector approaches a curve which should have a superelevation of three inches, he will set the pointer 17 to the three inch mark on the scale 18 above or below the zero point, according to the direction of curvature, and then when traveling around the curve if one of the balls appears in one of the apertures of the instrument it will indicate a deviation from the proper degree of superelevation of that curve. For traveling upon tangents, the pointer 17 is set at the zero mark.

The screw 9 is used to adjust the instrument to a level position before starting upon a trip of inspection. With the car standing upon a place in the track which has been previously ascertained by other means to be exactly level, the instrument is leveled upon the car by said screw 9. A spirit level 29 is mounted upon the plate 11 for this purpose.

Figure 5:
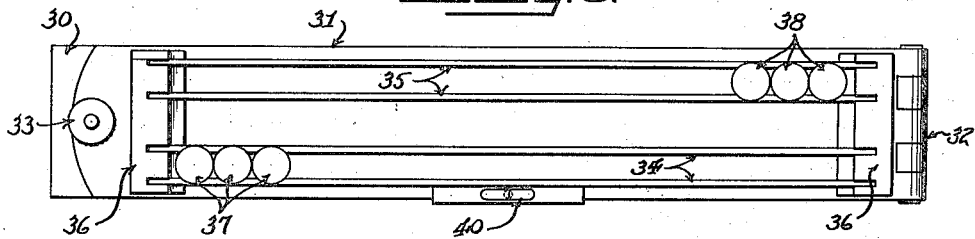
Fig. 5 is a plan view of the form shown in Fig. 4.

In the embodiment of the invention shown in Figs. 4 and 5, the principle of operation is the same, viz: that the deviation from level is indicated by balls traveling upon effectively curved raceways. In this form of device, the two raceways, instead of being positioned end to end, as in the previously described form, are side by side, each extending the full length of the instrument, thus providing a greater range of indication. Furthermore, the effective curvature of the raceways is provided by actual curvature of the upper edges of the strips of which they are formed, said strips being parallel throughout their length.

The numeral 30, Figs. 4 and 5, designates the base, upon which the plate 31 is mounted by means of a hinge 32 and a leveling or adjusting screw 33. The raceways are formed of strips 34 and 35 set on edge, their ends being inserted in vertical slots in end blocks 36. The strips are parallel throughout their length, and their upper edges are curved, as shown, whereby the effective curvature of the raceways is formed. The strips 34 form one raceway which curves upwardly from left to right, and the strips 35 form the other raceway, curving upwardly from right to left. The strips 35 are wider than the strips 34, so that the farther raceway is elevated above the nearer raceway, to enable the balls of said farther raceway to be clearly seen.

Balls 37 and 38 roll upon the respective raceways 34 and 35. As the left hand end of the instrument is raised, the balls 37 travel from their normal position at the left hand end of the raceway 34 toward its right hand end, the extent of their travel indicating the extent of deviation from level. As the right hand end of the instrument is raised, the balls 38 travel toward the left on the raceway 35. The raceways are marked with suitable scales 39, which preferably read directly in inches of superelevation of one rail above the other.

Three balls are preferably used on each raceway, as shown, the friction between said balls providing a damping effect to prevent them from over-running their true position and then rolling back and forth before coming to rest. The center ball of each group is preferably the indicator. A spirit level 40 is provided for initial setting to true level position.

The form of device shown in Figs. 4 and 5 has a greater range of indication than is obtained in the form shown in Figs. 1, 2, and 3, but is less sensitive. It also provides a continuous indication. For these reasons it is better adapted for use on sections of track in which curves predominate over tangents, providing instantaneous indication at all times of the amount of superelevation. The form shown in Figs. 1, 2, and 3, however, is preferable for use where tangents predominate because it is easier to read and more sensitive, giving a positive indication of a deviation from level as small as one quarter of an inch.

I claim:

1. A track level indicator comprising a pair of converging spaced strips set on edge, the upper edges of said strips forming a raceway, and a ball mounted to roll upon said raceway, the convergence of said strips causing said raceway to have an effective slope, whereby the ball remains at one position when the instrument is level but rolls to another position when the instrument is inclined.

2. A track level indicator comprising a pair of spaced strips set on edge in converging curved planes, the upper edges of said strips forming a raceway, and a ball mounted to roll upon said raceway, the converging curvature of said strips causing said raceway to have an effective curved slope, whereby the ball remains at one position when the instrument is level but rolls to other positions according to the degree of inclination of the instrument.

3. A track level indicator comprising a pair of spaced strips set on edge, the center portions of said strips being more widely spaced than their ends whereby their upper edges form a raceway having an effective slope upward toward each end, and a ball mounted to roll upon said raceway, said ball remaining in the center region of said raceway when the instrument is level but rolling toward one end or the other according to the direction in which the instrument is inclined.

4. A track level indicator comprising a pair of spaced strips set on edge, means holding the ends of said strips in spaced relation, a spacer between the center portions of said strips, said center spacer being wider than the end spacing means and extending above the upper edges of said strips, said upper edges forming two aligned raceways separated by said center spacer, the convergence of the end portions of said strips causing each raceway to have an effective slope upwardly from said center spacer, and a ball mounted to roll upon each raceway, said balls remaining adjacent said center spacer when the instrument is level but rolling toward the ends of said raceways when the instrument is inclined.

5. A track level indicator comprising a body having a groove of varying width, the edges of said groove forming a raceway with an effective slope, a ball mounted to roll upon said raceway, said ball assuming different positions in the length of said raceway according to the inclination of said body relative to the horizontal, and a housing over said raceway, said housing concealing said ball in one position and having an aperture exposing said ball to view in another position.

6. A track level indicator comprising a base, a frame member mounted upon said base, means for adjusting the inclination of said frame member with relation to said base to level the instrument, a body mounted upon said frame member, said body having a groove, the edges of said groove converging and forming a raceway with an effective slope, a ball mounted to roll upon said raceway for indicating the inclination of said body with relation to the horizontal, and means for adjusting the inclination of said body with relation to said frame member, whereby to set said body at a predetermined inclination with relation to said base.

7. A track level indicator comprising a body having a groove, the edges of said groove converging and forming a raceway with an effective slope, and a ball mounted to roll upon said edges as a raceway, the effective slope formed by the convergence of said edges causing the ball to remain at one position when the instrument is level and to roll to another position when the instrument is inclined.

8. A track level indicator comprising a body having a groove, the edges of said groove forming a raceway and being separated by a greater space in the central region of said groove than in its end regions, and a ball mounted to roll upon said raceway, the spacing of said edges causing said ball to remain in the central region of the raceway when the instrument is level and to roll toward one end or the other of said raceway when the instrument is inclined.

JAY A. GIVEN.